United States Patent [19]
Hoover et al.

[11] 3,869,615
[45] Mar. 4, 1975

[54] MULTIPLATE FOCUSING COLLIMATOR

[75] Inventors: Richard B. Hoover, Huntsville, Ala.;
James H. Underwood, Palos Verdes Peninsula, Calif.

[73] Assignee: The United States of America as represented by the Administrator of the National Aeronautics and Space Administration, Washington, D.C.

[22] Filed: June 28, 1973

[21] Appl. No.: 374,441

[52] U.S. Cl. .................. 250/508, 250/510, 250/505
[51] Int. Cl. .............................................. G21f 5/00
[58] Field of Search ........... 250/355, 508, 505, 513, 250/482, 510

[56] References Cited
UNITED STATES PATENTS

| | | | |
|---|---|---|---|
| 2,133,385 | 10/1938 | Freeman | 250/508 |
| 2,638,554 | 5/1953 | Bartow et al. | 250/355 |
| 2,665,387 | 1/1954 | Bartow | 250/508 |
| 2,741,710 | 4/1956 | Bartow et al. | 250/508 |
| 2,959,680 | 11/1960 | Green | 250/513 |

OTHER PUBLICATIONS
"Construction and Testing of Large Area X-Ray Collimators," Stewart et al., J. Phys., Vol. 41, No. 12, (1971), pp. 966–968.

*Primary Examiner*—James W. Lawrence
*Assistant Examiner*—B. C. Anderson
*Attorney, Agent, or Firm*—George J. Porter; L. D. Wofford, Jr.; John R. Manning

[57] ABSTRACT

An appartus for scanning relatively small near sources of penetrating radiation to obtain the energy distribution thereof, wherein a collimator assembly is interposed between a radiation source and a radiation detector. The collimator assembly has a plurality of plates aligned in parallel planes with respect to a common axis normal to their centers. All the plates have similar random distribution of apertures. All apertures on each plate are the same size. The size of respective plates, the size of the apertures of said respective plates, and the spacing between said respective plates vary precisely according to a predetermined ratio to produce radiation channels which converge to a focal point through corresponding ones of the similar random distribution of apertures of the plates. The radiation incident to the radiation detector is maximized when the focal point and the radiation source are coincident.

10 Claims, 3 Drawing Figures

MULTIPLATE FOCUSING COLLIMATOR

ORIGIN OF THE INVENTION

The invention described herein was made by employees of the U.S. Government and may be manufactured and used by or for the Government of the United States of America for governmental purposes without the payment of any royalties thereon or therefore.

BACKGROUND OF THE INVENTION

1. Field of the Invention

The invention relates to a focusing optical collimator capable of high resolution scanning of relatively small near sources of penetrating radiation. It has particular use in the electromagnetic radiations, including high energy X-rays and gamma rays, as well as with neutrons and particles.

2. Description of the Prior Art

It is often desirable, particularly in the field of nuclear medicine, to determine the energy distribution of a small near source of radiation by obtaining an image thereof through the use of a collimator. Previously, this has been accomplished by "focussing collimators" such as that described in "A Focussing Collimator for Research in Scanning," *Journal of Nuclear Medicine* 3, 10, 1962. These devices consist of a sheet of lead or suitable material containing an array of conical channels oriented such that their lines which pass through their centers all converge to a point. This device is then used to scan a region believed to contain a radiation source. When the device is oriented such that this 'focal point' coincides with a source the signal received at the scintillator is maximized. A major disadvantage with the prior art is that leakage through the septa separating adjacent channels produces a rather broad point spread function and thereby degrades the resolution.

Applicants' copending patent application entitled "Multiple Plate—Multiple Pinhole Collimator," Ser. No. 51,317 filed June 30, 1970, now U.S. Pat. No. 3,749,911, discloses a collimator that transmits radiation traveling parallel to its optical axis and eliminates off-axis radiation. The collimator consists of a plurality of similar sized plates, all of which are pierced with an identical random array of similar sized apertures. The plates are mounted perpendicular to a common or optical axis with like apertures on consecutive plates axially aligned. The collimator, when interposed between a near source of radiation and a penetrating radiation detector, transmits radiation traveling parallel to its optical axis to produce an image that is an array of dots corresponding to the apertures in the plates and confined to the boundaries of the source. To obtain an accurate representation of the intensity distribution of the source (i.e., fill in the image) the collimator may be translated perpendicular to its optical axis. During this translation the source and detector remain motionless.

SUMMARY OF THE INVENTION

The present invention relates to a novel collimator assembly of the spaced plate variety which consists of a sheet of lead or other suitable material wherein each plate is pierced with an identical random orientation of apertures. While the orientation of each array of apertures is identical, the size of apertures and the area covered by each plate changes between successive plates, and the spacing between adjacent plates is fixed so as to produce radiation channels which converge to a single focal point.

Accordingly, it is an object of the present invention to provide an optical collimator which is capable of high angular resolution in scanning relatively small near sources of penetrating radiation and discerning the energy distribution therein.

Another object of the invention is to provide a collimator which may be used with electromagnetic radiation particularly high energy X-rays, gamma rays and with neutrons.

DETAILED DESCRIPTION OF THE INVENTION

The invention consists of a multiplicity of plates, each of which is pierced with a plurality of apertures. The apertures have the same relative orientation on each plate. The apertures are all the same size the same relative orientation on each plate but the aperture size and spacings change from plate to plate in a very precise manner, so as to produce radiation channels which converge to a single point.

Figure 1:
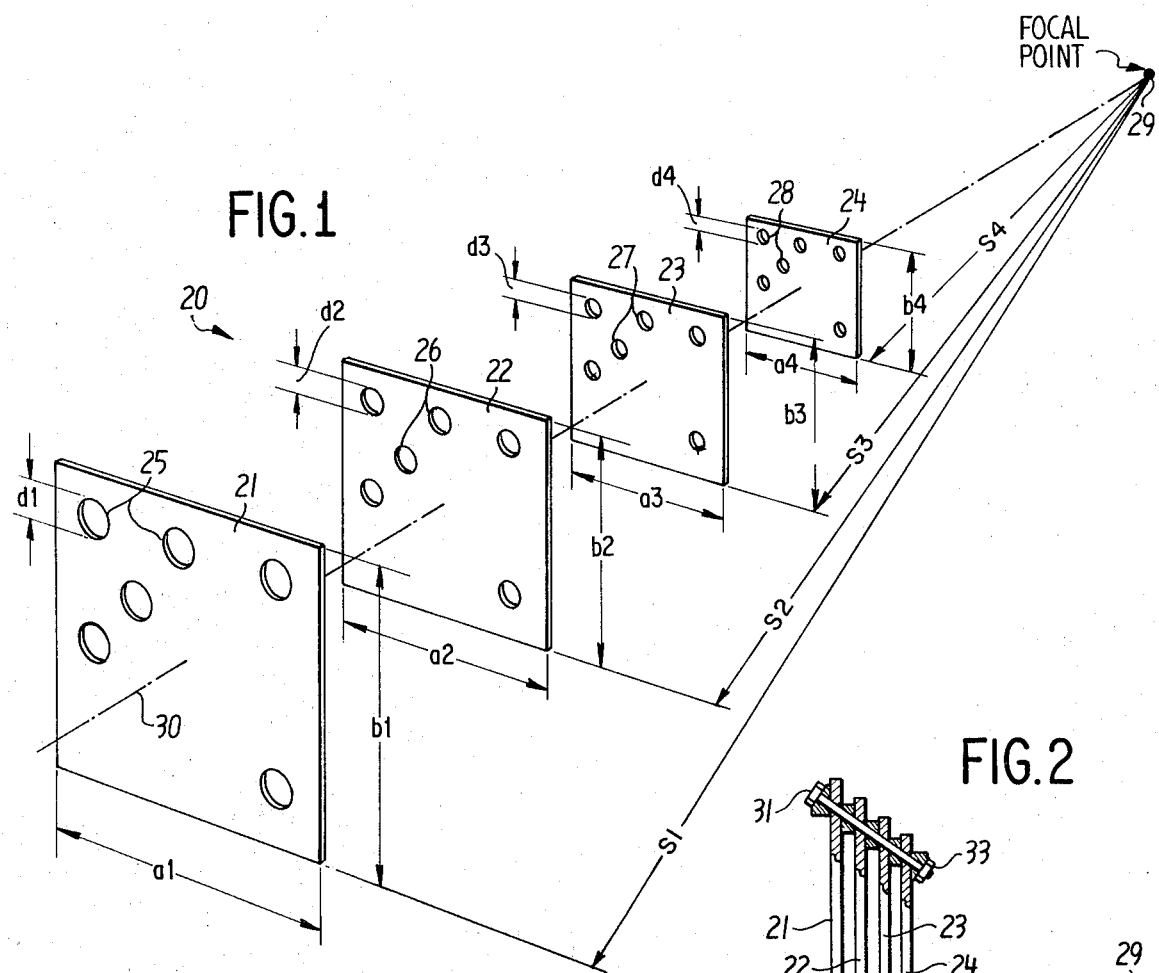
FIG. 1 is an exploded pictorial view of the collimator assembly according to the invention with parts broken away to illustrate the radiation channels obtained with the present invention.

FIG. 1 shows an assembly 20 comprising four plates 21 through 24. Each of plates 21 through 24 has a similar array of randomly located apertures 25 through 28 respectively.

The size of each plate and the apertures contained therein are related to the size of the other plates and the apertures contained therein according to a predetermined ratio, determined by certain parameters of the assembly. There is a constant linear rate of decrease of corresponding parameters of plates 21 through 24, with all parameters being focused to the focal point 29 of the assembly.

Thus if plate 21 comprises a rectangular plate with sides having lengths of $a1$ and $b1$, and defines random distribution of similar apertures 25 comprising circles having a diameter $d1$, plate 22 comprises a rectangular plate with sides having lengths $a2$ and $b2$ which are less than $a1$ and $b1$, and defines a similarly configured random distribution of circular apertures 26 of diameter $d2$ which is less than $d1$, in accordance with the following ratios, all of which are based on well known principles of geometry including the law of similar triangles which governs the proportional relationship of corresponding parts of similar triangles:

$(d1/d2) = (a1/a2) = (b1/b2)$

The same ratios are also valid between plates 21 and 23, plates 21 and 24 and, in general, between any of the plates comprising the assembly. Thus $(d1/d3) = (a1/a3) = (b1/b3)$, and $(d1/d4) = (a1/a4) = (b1/b4)$ The ratio of the spacings between the focal point and the plane of any two plates is equal to the ratio of the aperture diameters of corresponding plates. Thus if S1 designates the spacing between plate 21 and the focal point, S2 the spacing between plate 22 and the focal point, and S3 the spacing between plate 23 and the focal point, the following ratios are valid:

(S1/d1) = (S2/d2) = (S3/d3)

The result of fabricating the plates of the assembly to conform to the ratios described above is that all corresponding plate parameters converge to a common focal point 29, which produces radiation channels as explained hereafter which converge to a single point.

The plates 21 through 24 may be produced to meet the above-discussed ratios using conventional photo-etching techniques. Thus a master photographic plate can be used in conjunction with a photographic enlarger to focus the image of the apertures of the plates to be photoetched. At different enlargements, aperture size and rectangle area can then be maintained according to the predetermined ratio, while maintaining the identical orientation of the random array of apertures on all plates. See R. B. Hoover, *American Journal of Physics*, Vol. 9, pp. 861–876 (1969) for a discussion of techniques for fabrication of plates containing a random array of apertures of various shapes.

The plates may also be constructed such that the thickness thereof is also governed by the predetermined ratio. Although this is not required, it is useful for high energy applications.

Figure 2:
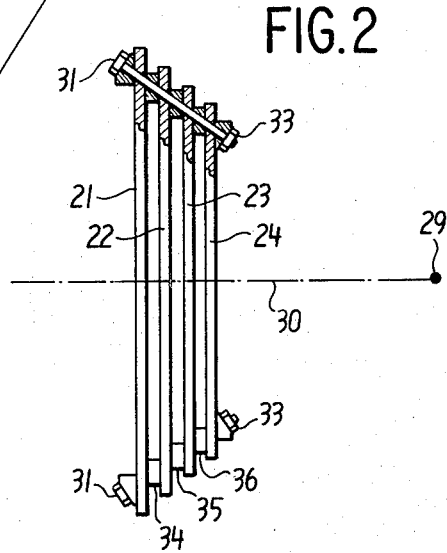
FIG. 2 shows the manner of assembling the multiplate collimator of FIG. 1.

To form a complete collimator, the plates 21 through 24 are assembled in aligned relationship with respect to the perpendicular axis 30, extending normal to their centers as shown in FIG. 2. Rods 31 extend through holes 32 defined in the corners of the plates, and nuts 33 are fitted to the threaded ends of the rods to hold the assembly together. Spacers 34 through 36 are interposed between adjacent plates 21 through 24 to provide the spacing required by the predetermined ratio discussed heretofore. The final alignment of the apertures of the plates is thus established by the engagement of the edges of holes 32 with rods 31 and with the use of spacers 34 through 36 constructed in accordance with the predetermined ratios. Since the edges of the holes 32 are formed photographically from a common master which insures a near-perfect identity of location between individual pieces and since the rods 31 can be easily made nearly perfectly linear, the alignment of corresponding apertures of the plates within the assembled collimator is accurate.

Figure 3:
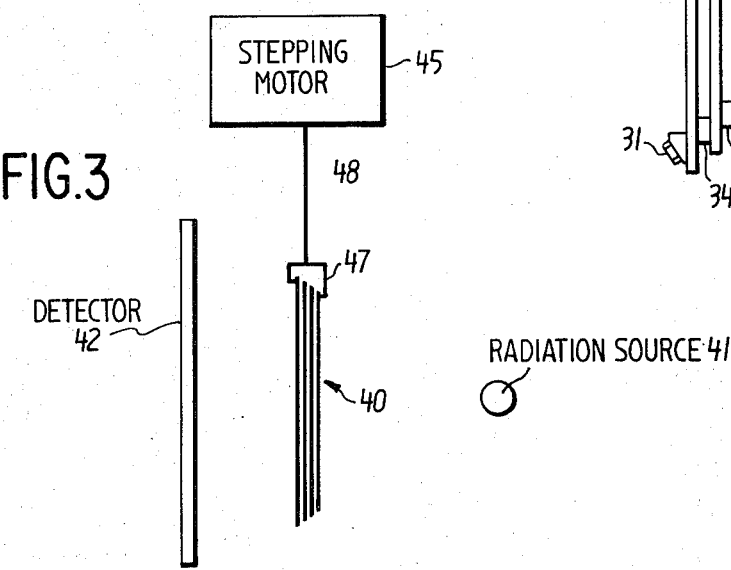
FIG. 3 illustrates a radiation detector system using the collimator assembly of FIG. 1.

FIG. 3 illustrates an application to which the collimator 40 according to the present invention is particularly suited. This particular apparatus is designed to scan a source of penetrating radiation 41 to discern its energy distribution. Radiation source 41 may be gamma rays and X-rays. The radiation emitted from radiation source 41 passes through collimator 40 and is incident to radiation detector 42. The detector has an output which varies with the magnitude of the incident radiation and may comprise for example a scintillator. Since the radiation channels defined by the apertures of the collimator 40 interposed between source 41 and detector 42 converge to a single point, the focal point thereof, orientation of the collimator 40 such that its focal point coincides with the radiation source 41 will maximize the radiation received by the detector 42. Conventional means can be employed to change the position of the collimator 40 during scanning. For example, a stepping motor 45 may be connected to a pivoted collimator support 47 by means of link 48, so that the operation of the motor 45 causes the collimator 40 to incrementally scan the source of radiation 41.

What is claimed is:

1. In an apparatus for scanning small near sources of penetrating radiation to obtain the energy distribution thereof, wherein a collimator assembly is interposed between a radiation source and a radiation detector, the improvement comprising:

a collimator assembly having a plurality of similar plates aligned in parallel planes, said plates having a common axis through all their respective centers, said axis being normal to said parallel planes; each said plate having a plurality of apertures the same size, the plurality of apertures on each said plate having a similar random distribution; the relative size of said plates and the spacing between said respective plates being arranged to produce radiation channels which converge to a focal point through corresponding ones of the similar random distribution of apertures of the plates, the diameter of the apertures and the length of the sides of said respective plates being directly proportional to the distance from said respective plates to the said focal point, the radiation incident on the radiation detector being maximized when the said focal point and the radiation source coincide.

2. The apparatus as recited in claim 1 further comprising:

support means to maintain the plurality of plates in aligned position, and spacing means interposed between successive plates to maintain the required spacing therebetween to satisfy the predetermined ratio.

3. The apparatus as recited in claim 1 wherein the ratio of the diameters of the apertures of any two plates is equal to the ratio of the corresponding sides, respectively, of the same two plates.

4. The apparatus as recited in claim 1 wherein the ratio of the distance from said focal point to a first plate to the distance from said focal point to a second plate is equal to the ratio of the length of a side of said first plate to the length of the corresponding side of said second plate.

5. The apparatus as recited in claim 4 further comprising:

support means to maintain the plurality of plates in aligned position, and spacing means interposed between successive plates to maintain the required spacing therebetween to satisfy the predetermined ratio.

6. A collimator assembly for pentrating radiation comprising:

a plurality of similar plates aligned in parallel planes, said plates having a common axis through their centers, normal to said parallel planes, each said plate having a plurality of equal-sized apertures arranged in a similar random distribution; the relative size of said plates and the spacing between said plates being arranged to produce radiation channels which converge to a focal point through corresponding apertures of said plates; the diameter of the apertures and the length of the sides of said respective plates being directly proportional to the distance from said focal point to said respective plates.

7. The collimator assembly recited in claim 6 further comprising:

support means to maintain the plurality of plates in aligned position, and spacing means interposed between successive plates to maintain the required spacing therebetween to satisfy the predetermined ratio.

8. The collimator assembly as recited in claim 6 wherein the ratio of the diameters of the apertures of any two plates is equal to the ratio of the corresponding sides, respectively, of the same two plates.

9. The collimator assembly as recited in claim 6 wherein the ratio of the spacings between the focal point and the plane of any two plates is equal to the ratio of the aperture diameters of corresponding plates.

10. The collimator assembly recited in claim 9 further comprising:

support means to maintain the plurality of plates in aligned position, and spacing means interposed between successive plates to maintain the required spacing therebetween to satisfy the predetermined ratio.

* * * * *